United States Patent Office 2,886,577
Patented May 12, 1959

2,886,577
HALOGENATED NAPHTHOQUINONES

Hsing Yun Fan, Denver, Colo., assignor to Shell Development Company, New York, N.Y., a corporation of Delaware No Drawing. Application July 6, 1956
Serial No. 596,165

4 Claims. (Cl. 260—396)

This invention relates to novel compounds, processes for preparing the same and means for utilizing them. More particularly, it relates to new halogenated naphthoquinones, the method for their preparation and their employment as foliage fungicides.

A number of halogenated naphthyl compounds are known to have fungicidal properties, but such compounds have not been particularly satisfactory as many of them are too phytotoxic. Further, many have the disadvantage of being unstable and not resistant to weathering conditions. These two factors are important in determining the worth of a foliage fungicide for if it is not able to withstand weather conditions, the fungicidal material may be washed away by rain from the area to which it is applied. As a result, the active ingredient has no beneficial result. Another aspect of weathering conditions is the break-down of the active ingredient due to photodecomposition in which case the active ingredient is rendered less active or, more likely, totally inactive. It is noted that there is a tendency of halogenated compounds, particularly polyhalogenated aromatic compounds, to be very susceptible to photodecomposition which has severely limited their usefulness as plant fungicides.

In a similar manner phytotoxicity has greatly limited the range of compounds that may be used for this purpose for although a compound may have desirable fungicidal properties, it cannot be used if it severely attacks the host plant to which it is applied. As fungi have some characteristics similar to higher plants, it is not surprising to find that the most effective fungicides will also exhibit phytotoxic properties. As a result, present day foliage fungicides are mainly a compromise among those compounds that are least phytotoxic at concentrations that are effective to combat fungi. Also to be considered are such matters as cost for when applied to large acreages, the expense of treatment can soon become unprofitable if the active ingredient is not low in price. Included in the consideration of the cost of application are the compatibility of the fungicide, its solubility in water and other common solvents, and similar considerations that are important in the actual application of the active ingredient to the plants or soil.

The result of these and other considerations is that a rather small number of foliage fungicides have been able to meet the requirements of a commercial product.

It has now been found that the novel halogenated naphthoquinones of this invention possess an unexpected ability to combat foliage fungi and at the same time do not cause phytotoxicity when at proper concentrations.

The novel compounds of this invention are tetrahalogenated methanonaphthoquinones. More specifically they are 2,3,6,9-tetrahalo-5,6,7,8-tetrahydro-5,8-methanonaphthalenedione-1,4 having the structural formula

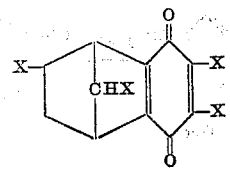

wherein X represent a halogen atom such as chlorine or bromine.

The nature of the products can be better understood by making reference to the following equations which illustrate the reactions and process by which the novel compounds are prepared from 5,8-methano-4a,5,8,8a-tetrahydronaphthalenedione-1,4:

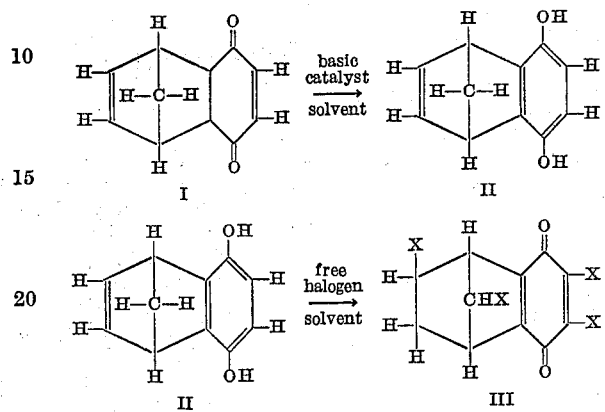

It is a particularly surprising feature that the process should yield the products of this invention because it is known that the reaction of 5,8-methano-4a,5,8,8a-tetrahydronaphthalenedione-1,4 in the presence of free chlorine yields a hexa-chlorinated product in which four of the chlorine atoms are substituted for hydrogen and two are added at a double bond. Therefore, it would be expected that the same, or at least a similar addition and substitution would result from the use of the corresponding naphthalenediol. This however, is not the case.

A primary starting material for the preparation of the novel compounds of this invention is 5,8-methano-5,8-dihydronaphthohydroquinone represented by Formula II above which may be obtained by the isomerization of 5,8-methano-4a,5,8,8a-tetrahydronaphthalenedione - 1,4, shown by Formula I above, in the presence of a basic catalyst such as sodium hydroxide, triethanolamine, or the like. The isomerization reaction is conducted in the presence of any common organic solvent such as the lower alcohols, for example, methanol, ethanol, isopropanol, and the like. Other suitable solvents include dimethyl and diethyl ethers, methyl acetate, acetone, methyl ethyl ketone, benzene, toluene, and the like. Its preparation is more fully described below.

EXAMPLE I

To a reaction vessel equipped with a reflux condenser, agitator, heating and cooling means and a thermometer are charged 40 grams of 5,8-methano-4a,5,8,8a-tetrahydronaphthalenedione-1,4 (Formula I above), 1 ml. of triethanolamine and 320 ml. of methanol. The reaction mass is refluxed for 1 hour after which the solvent is stripped. The residue is recrystallized from water to yield 92% of the material of Formula II which has a melting point of 147–148.5° C.

From the 5,8-methanonaphthohydroquinone thus produced the halogenated products of the invention may be prepared. It is preferred that the halogenation be conducted in the presence of a neutral inert solvent such as carbon tetrachloride which causes the product to precipitate as it forms. If desired, small amounts of methanol may be added to facilitate solution of the starting hydroquinone. The reaction should be conducted under anhydrous conditions for the reason that the reaction proceeds with greater ease and assures a purer product.

The reaction is rather highly exothermic. This has the undesirable effect of causing the reaction to be too rapid and for that reason means should be provided for cooling the mass while the reaction proceeds. This may be optionally accomplished in any of several ways. One such method is to provide cooling coils within the reaction vessel or by the use of a jacketed kettle through which a cooling liquid is circulated. Alternatively, a quantity of an inert low-boiling liquid such as carbon tetrachloride is charged to the reaction mixture in which case cooling is accomplished by the refluxing of the low-boiling liquid.

Preferably, the reaction should be conducted at a temperature of about 25° C. as the low temperature provides better control of the reaction rate. The reaction may be conducted at temperatures of about 70 or 80° C. in which case care must be taken to avoid over-halogenation. At temperatures substantially in exces of 80° C., it is found that yields of the desired product are lower.

In order to accomplish the desired substitutions and additions of the halogen atoms on the dihydronaphthohydroquinone (Formula II) it is found that the quantity of the halogen that is introduced into the reaction mixture must be carefully controlled as excesses of the halogen will result in over-halogenation. This in turn will depend on such factors as the size of the batch, the particular halogen involved, the temperature of the reaction, and the like. As a generalization, it may be stated that the desired product is first formed and appears as the initial precipitate and continues to form for a short time thereafter. Desirably then, the free halogen should not be permitted to remain in contact with the reaction mixture substantially beyond the time after the first precipitate forms. This may be controlled in the case of chlorine and bromine by bubbling these gases through the solution in the reaction vessel.

As the reaction conditions preferably require that the mixture be free of moisture, and as hydrogen halide is formed during the reaction, the vessel should be equipped with means whereby most of the hydrogen halide may escape as it is formed without permitting atmospheric moisture to enter the vessel. This may be accomplished by any conventional means such as a dehydrating fixture attached to an outlet from which the hydrogen halide escapes.

The invention can be better illustrated by the following example which demonstrates the various embodiments of the process.

EXAMPLE II

To a reaction vessel equipped with an agitator, thermometer, reflux condenser, cooling means, an inlet and an outlet having attached thereto a tube containing magnesium sulfate, is charged, with gentle agitation, 10 grams of the compound prepared in Example I, 16 ml. of anhydrous methanol and 200 ml. of anhydrous carbon tetrachloride. Dry chlorine is then bubbled through the reaction mixture whereupon the solvents begin to reflux. The reaction mixture darkens at first and a reddish layer separates on top. Hydrogen chloride is evolved as the reaction proceeds and escapes through the outlet. When a voluminous yellow precipitate separates, the chlorine supply is cut off. Thereafter the carbon tetrachloride and the methanol are evaporated whereupon any residual chlorine and hydrogen chloride are also removed. Upon cooling, two crops of a yellow solid are produced. The first crop of 10.6 grams has a melting point of 168 to 171° C. and the second crop has a melting point of 151 to 159° C. The combined product is recrystallized from carbon tetrachloride to yield 60% of a yellow crystalline solid having a melting point of 176 to 177° C. and is identified as 2,3,6,9-tetrachloro-5,6,7,8 - tetrahydro - 5,8-methanonaphthalenedione-1,4. It has the following analysis: C, 42.26%; H, 2.21%; Cl, 45.6%. Calculated: C, 42.31%; H, 1.92%; Cl, 45.51%.

The same product is obtained by using a conventional jacketed kettle for cooling in which the temperature is not permitted to rise above 60° C. Anhydrous methanol is used as the solvent with the stoimetrical amount of chlorine being added.

EXAMPLE III

The procedure of Example II is repeated except that bromine is bubbled through the reaction mixture to yield 2,3,6,9-tetrabromo-5,6,7,8-tetrahydro-5,8 - methanonaphthalenedione-1,4.

There are other methods for the preparation of the novel compounds of this invention. One such method comprises the following sequence of steps as applied to the chloro-derivative:

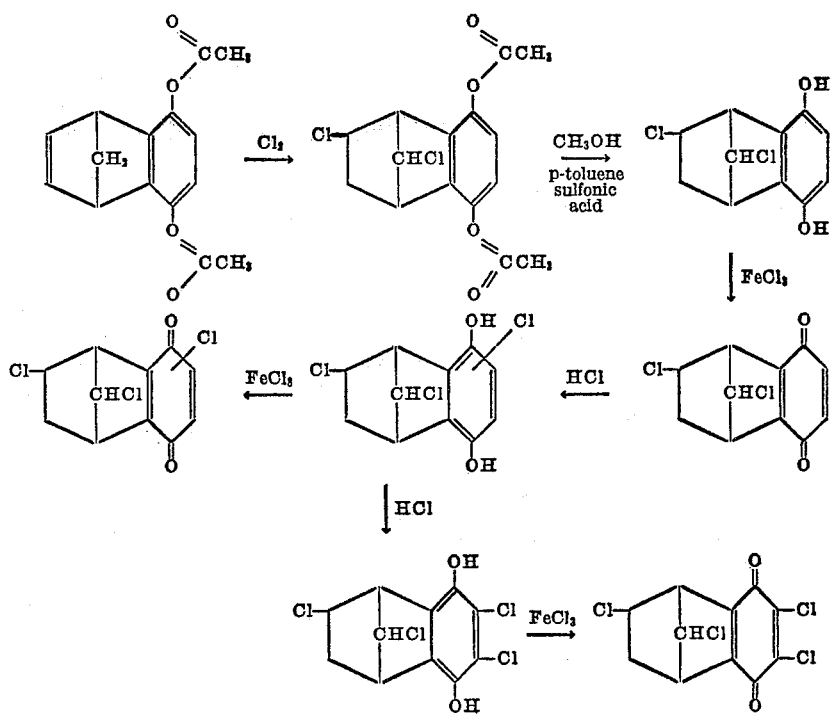

Another method for the preparation of the novel products of this invention comprises the dehalogenation of a hexahalogenated naphthalenedione as follows:

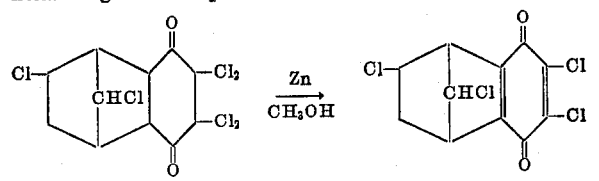

Still other methods are available but the most preferred methods are those described in the examples.

The quantity of the polyhalogenated naphthalenediones of this invention required for effective results in combating plant fungi will vary depending upon a number of factors such as the nature of the fungus, the degree of infestation, the time of application, the nature of the plant to be treated, and the like. For these reasons, it is found that the effective amounts may range from about 1% to 90% of the total composition that is applied. However, it is found that in most instances, the quantity of the active ingredient will range from about .0125 to 1% by weight although under certain circumstances higher or lower quantities may be required. In general, the larger concentrations are required when applied to plants that have become infested prior to the application of the fungicidal composition while the lower concentrations are used effectively to prevent the occurrence of fungus growth. The active ingredient of this invention may be contained in a solid carrier such as dust or powder of pyrophyllite, vegetable powder, silica gel, bentonite or other clay-like substances. When such compositions have added thereto, a wetting agent, they are termed "wettable powders" and are used as dispersions or suspensions in water by spraying or dipping. Alternatively, they may be contained in compositions of organic solvents, aqueous emulsions or aqueous solutions. If desired the composition may contain a quantity of a hydocarbon oil in which case an aqueous emulsion is formed. Such oils cause the active ingredient to stick to the plant to which they are applied and are broadly termed "sticking agents."

Considering the various compositions for application of the novel fungicides of this invention, it is found that, most economically, they may be applied in aqueous emulsion using a surface active wetting agent as an emulsifier. Such wetting agents include common trade names as Marasperse N, Nacconol A, Triton X–100, Emulphor EL, and the like. One such composition comprises about 2% of a surface active agent, 1% of the active ingredient and the balance being water.

The following test data indicate the effectiveness of the novel compositions of this invention as to fungicidal and phytotoxic properties. In the test for fungicidal effect, the active ingredient is prepared as an aqueous suspension in the indicated amount and sprayed on growing plants to the run-off point. After a few days, the plant is sprayed with a solution containing a number of fungus spores which are commonly known to attack the indicated plant. The percent of disease is determined by a trained plant pathologist.

*Table I*

PERCENT OF DISEASE CONTROL

| Treatment | Percent W. In Spray | Celery Blight | Bean Rust | Tomato Blight | Apple Scab |
|---|---|---|---|---|---|
| Tetrachloro-derivative of Example II | 0.24 | 100 | 92 | 92 | 100 |
| | 0.06 | 100 | | 75 | 100 |

Table II shows the percentage of phytotoxicity, i.e., the damage to leaves, for the same plants as in Table I.

*Table II*

PHYTOTOXICITY, PERCENT

| Treatment | Percent W. In Spray | Celery | Bean | Tomato | Apple |
|---|---|---|---|---|---|
| Tetrachloro-derivative of Example II | 0.24 | 0 | 10 | 15 | 0 |
| | 0.06 | 0 | 5 | 5 | 0 |

Comparable results are obtained using the bromo-derivatives. From the foregoing tables it will be seen that the chloro-derivative is particularly outstanding when used in the treatment of apple scab and celery late blight. They also are satisfactory in the treatment of other plant fungi but to a lesser degree. Nevertheless, it will be seen that the lesser degree of effectiveness represents a substantial improvement in the art.

In addition to the utility described above, the novel compounds of this invention may be utilized as seed protectants. When used for this purpose, the seeds are usually blended with dusts containing rather high concentrations of the active ingredient, i.e., in the order of 5 to 20% or higher.

I claim as my invention:

1. A process for the production of tetrahalogenated methanonaphthoquinone comprising the step of reacting 5,8-methano-5,8-dihydronaphthohydroquinone with free halogen in the presence of a neutral inert solvent, at a temperature of from 25° C. to 80° C. under anhydrous conditions.

2. A process for the production of 2,3,6,9-tetrachloro-5,6,7,8 - tetrahydro - 5,8 - methanonaphthalenedione - 1,4 comprising the step of reacting 5,8-methano-5,8-dihydronaphthohydroquinone with dry chlorine in the presence of a neutral inert solvent, at a temperature of from 25° C. to 80° C. under anhydrous conditions.

3. A process for the production of 2,3,6,9-tetrachloro-5,6,7,8 - tetrahydro - 5,8 - methanonaphthalenedione - 1,4 comprising the step of reacting 5,8-methano-5,8-dihydronaphthohydroquinone with dry chlorine in the presence of carbon tetrachloride at a temperature of from 25° C. to 80° C. under anhydrous conditions.

4. A process for the production of 2,3,6,9-tetrabromo-5,6,7,8 - tetrahydro - 5,8 - methanonaphthalenedione - 1,4 comprising the step of reacting 5,8-methano-5,8-dihydronaphthohydroquinone with bromine in the presence of a neutral inert solvent, at a temperature of from 25° C. to 80° C. under anhydrous conditions.

References Cited in the file of this patent

UNITED STATES PATENTS

| | | |
|---|---|---|
| 2,475,288 | Ladd | July 5, 1949 |
| 2,507,207 | Hyman | May 9, 1950 |
| 2,507,208 | Hyman | May 9, 1950 |
| 2,584,139 | Lidov et al. | Feb. 5, 1952 |
| 2,584,140 | Segal et al. | Feb. 5, 1952 |
| 2,609,376 | Ladd et al. | Sept. 2, 1952 |